(12) United States Patent
Okada et al.

(10) Patent No.: US 10,020,714 B2
(45) Date of Patent: Jul. 10, 2018

(54) METHOD OF MANUFACTURING ROTOR

(71) Applicant: TOYOTA JIDOSHA KABUSHIKI KAISHA, Toyota-shi (JP)

(72) Inventors: Ichiro Okada, Toyota (JP); Hiroaki Urano, Miyoshi (JP); Katsuhiko Tatebe, Toyota (JP); Fumiki Tanahashi, Toyota (JP); Michitaka Hori, Tachikawa (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 256 days.

(21) Appl. No.: 14/852,816

(22) Filed: Sep. 14, 2015

(65) Prior Publication Data
US 2016/0079833 A1    Mar. 17, 2016

(30) Foreign Application Priority Data

Sep. 15, 2014 (JP) .................................. 2014-187156

(51) Int. Cl.
*H02K 15/03* (2006.01)

(52) U.S. Cl.
CPC ..................... *H02K 15/03* (2013.01)

(58) Field of Classification Search
CPC .......... H02K 3/32; H02K 21/26; H02K 15/03; H02P 6/00; H02P 6/30; H02P 6/32
See application file for complete search history.

(56) References Cited

U.S. PATENT DOCUMENTS

| 4,748,362 A | * | 5/1988 | Hedlund | ................ | H02K 1/246 310/162 |
| 5,717,316 A | * | 2/1998 | Kawai | .................... | H02K 21/16 310/156.49 |

(Continued)

FOREIGN PATENT DOCUMENTS

| CN | 1645718 A | 7/2005 |
| CN | 102738926 A | 10/2012 |

(Continued)

OTHER PUBLICATIONS

Combined Office Action and Search Report dated Jul. 27, 2017 in Chinese Patent Application No. 201510566781.5 (submitting English translation only).

*Primary Examiner* — Carl Arbes
(74) *Attorney, Agent, or Firm* — Oblon, McClelland, Maier & Neustadt, L.L.P.

(57) ABSTRACT

The invention relates to a method of manufacturing a rotor for performing a magnetizing process of magnetizing a plurality of magnet materials that are assembled in a rotor core. A magnetization device is used which has a coil group configured of a plurality of coils that are disposed side by side in a manner that winding directions of adjacent coils are opposite to each other, the coil group is configured of sub coils at both ends and two or more main coils between the sub coils, and all of the coils are connected in series. Further, in the magnetizing process, a partial magnetization of magnetizing the magnet material among the plurality of magnet materials to which magnetic flux interlinking with two adjacent main coils is applied is performed a plurality of times, so as to magnetize all the plurality of magnet materials.

5 Claims, 13 Drawing Sheets

(56) References Cited

U.S. PATENT DOCUMENTS

| | | | | |
|---|---|---|---|---|
| 6,204,587 B1* | 3/2001 | Torok | ................. | H02K 1/246 |
| | | | | 310/168 |
| 6,727,629 B1* | 4/2004 | Soghomonian | ........ | H02K 21/22 |
| | | | | 310/112 |
| 6,803,690 B2* | 10/2004 | Bosch | ................. | H02K 1/2726 |
| | | | | 310/154.21 |

FOREIGN PATENT DOCUMENTS

| | | |
|---|---|---|
| CN | 103028586 A | 4/2013 |
| JP | 6-38459 | 2/1994 |
| JP | 2006-304556 | 11/2006 |

\* cited by examiner

METHOD OF MANUFACTURING ROTOR

INCORPORATION BY REFERENCE

The disclosure of Japanese Patent Application No. 2014-187156 filed on Sep. 15, 2014 including the specification, drawings and abstract is incorporated herein by reference in its entirety.

BACKGROUND OF THE INVENTION

1. Field of the Invention

The invention relates to a method of manufacturing a rotor that can be used in an electric motor or a generator, and more particularly, relates to a method of manufacturing a rotor by magnetizing separately a plurality of magnet materials embedded in a rotor core in a plurality of times.

2. Description of Related Art

Conventionally, as a rotor used in an electric motor or a generator, there is a rotor with a plurality of magnets that are embedded in a rotor core formed by laminating steel sheets. For example, such a rotor can be manufactured by embedding an unmagnetized magnet material in the rotor core and magnetizing the embedded magnet material.

The magnet material embedded in the rotor core is magnetized by applying a magnetic field from outside to the magnet material. Also, depending on an arrangement of a plurality of magnet materials in the rotor, sometimes it is difficult to magnetize them all by applying an external magnetic field once. In such a case, a method of magnetizing all the magnet materials by applying separately external magnetic fields that are different from each other a plurality of times is employed.

Further, when applying an external magnetic field to one rotor a plurality of times, the external magnetic field shall be generated in such a manner that the polarization of the magnet material that is magnetized by other external magnetic field is not opposite to the polarization of the final product. For example, it is difficult to manufacture a final product by polarizing reversely a magnet that has been polarized in the opposite direction by an external magnetic field applied previously.

For example, in Japanese Patent Application Publication No. 6-38459 (JP 6-38459 A), it is described a method of using a magnetization apparatus having a first winding portion and a second winding portion with a number of turns less than the first winding portion that are arranged alternately along outer periphery of a rotor to magnetize a plurality of sheets to be magnetized of the rotor. Also, in JP 6-38459 A, a magnetic field is generated by energizing the first winding portion and the second winding portion synchronously two times. That is, in the energizing of the first time, a portion of the sheets to be magnetized is magnetized, and in the energizing of the second time after the rotor is rotated, the sheets to be magnetized that are not magnetized targets in the first time are magnetized. Further, the first winding portion is a winding portion for magnetizing the sheets to be magnetized by the generated magnetic field. The second winding portion is a winding portion for generating such a magnetic field that the magnetic field generated by the first winding portion in the first and second magnetizations is not applied as a reverse magnetic field to the sheets to be magnetized that are not magnetized targets of the second magnetization. Thus, it is possible to improve the magnetization efficiency.

However, in the above prior art, the first winding portion for generating a magnetic field for magnetizing and the second winding portion with the number of turns less than the first winding portion are provided in different current paths respectively and are connected in parallel. Therefore, in order to completely prevent the sheets to be magnetized that are not magnetized targets from being polarized reversely by the magnetic field for magnetizing with respect to the polarization of the final product, it is necessary to generate the magnetic field with the first and second winding portions in a completely matched timing. This is because when the magnetic field is not generated by the second winding portion, there is a possibility that the magnetic field for magnetizing that is generated by the first winding portion is applied as a reverse magnetic field to the sheets to be magnetized that are not magnetized targets.

However, in order to generate the magnetic fields with the first and second winding portions in the completely matched timing, it is necessary to adjust the timing of starting the energizing of the current paths, the energizing time, the values of currents flowing in the current paths and the like with a very high precision. For this reason, there is a problem that it is very difficult to completely prevent the sheets to be magnetized that are not magnetized targets from being polarized reversely by the magnetic fields for magnetizing.

SUMMARY OF THE INVENTION

The object of the invention is to provide a method of manufacturing a rotor that can reliably prevent a plurality of magnet materials that are assembled in a rotor core from being magnetized in the opposite direction to that of the polarization of the magnet materials in a final product, and can easily perform the magnetization by a plurality of partial magnetizations.

A method of manufacturing a rotor of an aspect of the invention, arranges a rotor core in which a plurality of magnet materials are assembled in a magnetic field application region of a magnetization device, and manufactures a rotor by performing a magnetizing process, wherein an external magnetic field is generated in the magnetic field application region by the magnetization device in the magnetizing process to magnetize the magnet materials, the method of manufacturing the rotor being characterized by, as the magnetization device, using a magnetization device in which the magnetization device has at least one coil group that is configured of a plurality of coils for generating magnetic fields by being energized, which are arranged side by side outside the magnetic field application region in a manner that winding directions of adjacent coils are opposite to each other, the coil group is configured of sub coils that are located at both ends among the plurality of coils and two or more main coils that have a number of turns higher than the sub coils and are located between the sub coils at both ends, and the coils in the coil group are all connected in series, wherein a plurality of partial magnetizations are performed in the magnetizing process, one of the coil group and the rotor core is rotationally moved around an axis of the rotor core between the plurality of partial magnetizations to magnetize all the plurality of magnet materials, and in the partial magnetizations, the coil group is energized in a state of arranging the rotor core in the magnetic field application region of the magnetization device to generate an external magnetic field, so as to magnetize the magnet material among the plurality of magnet materials to which magnetic flux interlinking with two adjacent main coils is applied.

In the method of manufacturing the rotor of the above aspect of the invention, it is possible to generate the magnetic fields at the same time with the main coils and the sub coils of the coil group by energizing the coil group. Therefore, in each partial magnetization of the magnetizing process, it is possible to form a strong magnetic field that is generated by the main coils, which always passes through the inside of the adjacent main coils or sub coils. Consequently, it is possible to reliably control the strong magnetic field that is generated by the main coils, and prevent the magnet material that is not a magnetized target in this partial magnetization from being magnetized in the opposite direction to that of the polarization in the rotor of the final product. That is, it is possible to easily magnetize the plurality of magnet materials that are assembled in the rotor core by the plurality of partial magnetizations while reliably preventing the respective magnet materials from being magnetized in the opposite direction to that of the polarization of them in the final product.

Further, in the method of manufacturing the rotor as described above, the rotor may, for each pole, have a first magnet that is arranged to face the outer peripheral surface of the rotor core, and second and third magnets that both are arranged to incline with respect to the radial direction of the rotor core and to become far away from each other as closing to the radial outside of the rotor core and that face the surface of the first magnet closing to the inner peripheral side of the rotor core. In such a rotor having three magnets for each pole, a part of each of the second magnet and the third magnet is arranged at the inside of the rotor core. Therefore, in the magnetizing process for manufacturing the rotor having three magnets for each pole, it is necessary to generate a strong magnetic field that extends to the inside of the rotor core as possible. Thus, this is because by using the magnetization device with a plurality of main coils being arranged side by side, it is possible to generate the strong magnetic field by the adjacent main coils and even make it reach the inside of the rotor core.

Further, in the method of manufacturing the rotor as described above, the magnetization device may have two coil groups, each of the coil groups may have two main coils, and a current may be capable of flowing in a circuit connected to the coil groups in a first direction and a second direction that is opposite to the first direction, a first partial magnetization, a second partial magnetization, a third partial magnetization and a fourth partial magnetization may be performed in the magnetizing process in a state of arranging the rotor core in which the magnet materials of eight poles are assembled in the magnetic field application region of the magnetization device, so as to magnetize all the magnet materials of the eight poles, in the first partial magnetization, the current may be caused to flow in the first direction, in the second partial magnetization, at a rotational position after a position of the rotor core with respect to the coil groups is rotated by 90° or 270° in a first rotation direction from a first position relationship, the current may be caused to flow in the first direction, wherein the first position relationship may be a position relationship between the rotor core and the coil groups in the first partial magnetization, in the third partial magnetization, at a rotational position after the position of the rotor core with respect to the coil groups is rotated by 135° or 315° in the first rotation direction from the first position relationship, the current may be caused to flow in the second direction, in the fourth partial magnetization, at a rotational position after the position of the rotor core with respect to the coil groups is rotated by 45° or 225° in the first rotation direction from the first position relationship, the current may be caused to flow in the second direction. This is because it is possible to magnetize all the magnet materials of the eight poles that are assembled in the rotor core while reliably preventing the respective magnet materials from being magnetized in the opposite direction to that of the polarization of them in the final product.

Further, in the method of manufacturing the rotor as described above, the magnetization device may have one coil group, the coil groups may have has three main coils, and a current may be capable of flowing in a circuit connected to the coil group in a first direction, a first partial magnetization, a second partial magnetization, a third partial magnetization and a fourth partial magnetization may be performed in the magnetizing process in a state of arranging the rotor core in which the magnet materials of eight poles are assembled in the magnetic field application region of the magnetization device, so as to magnetize all the magnet materials of the eight poles, in the first partial magnetization, the current may be caused to flow in the first direction, in the second partial magnetization, at a rotational position after a position of the rotor core with respect to the coil group is rotated by 180° in a first rotation direction from a first position relationship, the current may be caused to flow in the first direction, wherein the first position relationship may be a position relationship between the rotor core and the coil group in the first partial magnetization, in the third partial magnetization, at a rotational position after the position of the rotor core with respect to the coil group is rotated by 270° in the first rotation direction from the first position relationship, the current may be caused to flow in the first direction, in the fourth partial magnetization, at a rotational position after the position of the rotor core with respect to the coil group is rotated by 90° in the first rotation direction from the first position relationship, the current may be caused to flow in the first direction. This is because it is possible to magnetize all the magnet materials of the eight poles that are assembled in the rotor core while reliably preventing the respective magnet materials from being magnetized in the opposite direction to that of the polarization of them in the final product. Further, since the number of coils is reduced, it is possible to reduce a voltage applied to the circuit that is connected to the coil group. In addition, since there is no need to switch a flow direction of the current, it is possible to use an inexpensive magnetization device.

According to the above aspect of the invention, it is possible to provide a method for manufacturing a rotor that can easily magnetize a plurality of magnet materials that are assembled in a rotor core by a plurality of partial magnetizations while reliably prevent the respective magnet materials from being magnetized in the opposite direction to that of the polarization in a final product.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, the best modes embodying the invention will be described in detail with reference to the drawings. The embodiment is an embodiment that applies the invention to a method of manufacturing an eight-pole rotor having three magnets for each pole.

First Embodiment

Figure 1:
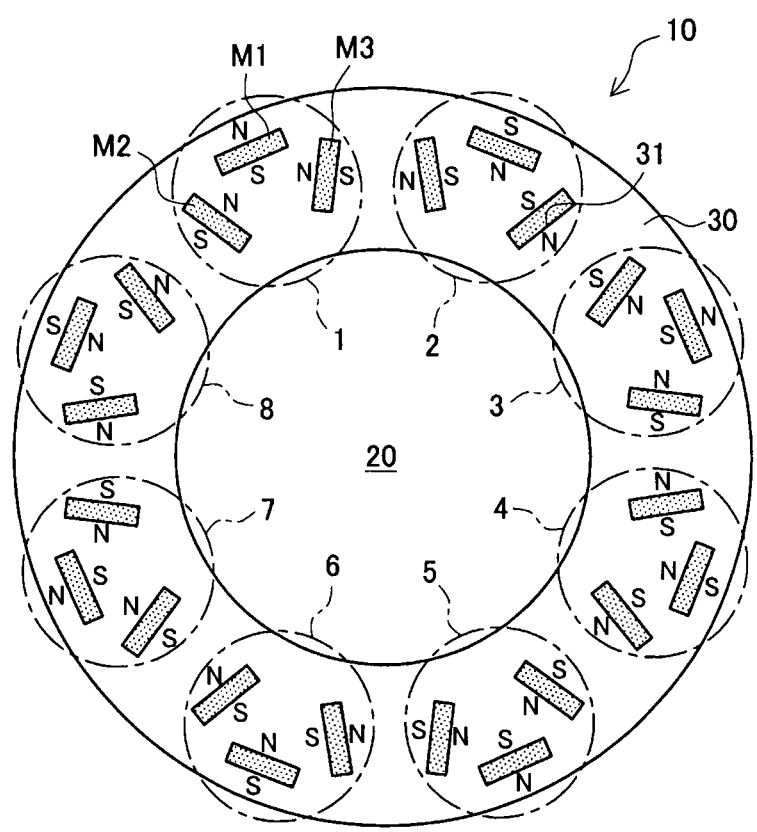
FIG. 1 is a plan view of a rotor that is manufactured by a magnetizing process according to the first embodiment.

First, a rotor manufactured by the method of manufacturing the rotor according to the embodiment will be described. FIG. 1 is a schematic top view of the rotor 10 according to the embodiment. As shown in FIG. 1, the rotor 10 is configured by assembling a rotor core 30 to the outer periphery of a shaft 20. In addition, a plurality of magnets M1, M2, M3 are assembled in the rotor core 30. Specifically, as indicated by a dashed line in FIG. 1, the rotor core 30 has eight groups from group 1 to group 8, each of which is configured of one magnet M1, one magnet M2 and one magnet M3.

The rotor core 30 is formed by laminating a plurality of electromagnetic steel sheets in a depth direction in FIG. 1. Moreover, holes are formed at the same positions in the laminated electromagnetic steel sheets, and a plurality of slots 31 are formed in the rotor core 30 by overlapping the holes. Thus, the magnets M1, M2, M3 are mounted in each slot 31 of the rotor core 30.

The magnets M1, M2, M3 are magnets with a high magnetic flux density and a strong magnetic force, for example, neodymium magnets. As shown in FIG. 1, each of the magnets M1, M2, M3 has a south (S) pole and a north (N) pole. Moreover, the magnets M1, M2, M3 each are magnetized approximately to a saturation point. Further, as shown in FIG. 1, the eight groups of the magnets M1, M2, M3 are evenly arranged in the peripheral direction of the rotor 10.

As shown in FIG. 1, the magnet M1 is assembled to face the outer peripheral surface of the rotor core 30 at a position close to the outer peripheral surface. The magnets M2, M3 each are assembled to the rotor core 30 in a manner of inclining with respect to the radial direction of the rotor core 30 and becoming far away from each other as closing to the radial outside in each group. In addition, the magnets M2, M3 each face the surface of the magnet M1 closing to the inner peripheral side of the rotor core in each group.

Also, each of the magnets M1, M2, M3 that are assembled in this manner is magnetized, as shown in FIG. 1. Specifically, the magnets M1, M2, M3 each have magnetic poles on inner sides facing each other in each group and on outer sides that are opposite to the inner sides respectively. The magnetic poles on the inner sides of the magnets M2 and M3 in each group are different from the magnetic poles on the inner sides of the magnet M1 which they face. Also, for the groups that are adjacent to each other, the magnetic poles of each of magnets M1, M2, M3 are opposite.

That is, the magnets M1, M2, M3 of each group are magnetized such that eight poles are formed in the peripheral direction with S poles and N poles alternately on the outer peripheral side of the rotor core 30. Specifically, the odd numbered groups 1, 3, 5, 7 of the groups 1 to 8 shown in FIG. 1 are magnetized with the N poles on the outer peripheral side of the rotor core 30. On the other hand, the even numbered groups 2, 4, 6, 8 of the groups 1 to 8 shown in FIG. 1 are magnetized with the S poles on the outer peripheral side of the rotor core 30. That is, the rotor 10 according to the embodiment shown in FIG. 1 is an eight-pole rotor having three magnets M1, M2, M3 for each pole.

The rotor 10 according to the embodiment is manufactured by assembling the shaft 20 and eight groups of the magnets M1, M2, M3 to the rotor core 30 that is formed by laminating a plurality of electromagnetic steel sheets. Further, in this embodiment, the magnets M1, M2, M3 each are assembled to the rotor core 30 in the form of a magnet material that is not magnetized. Then the rotor 10 according to the embodiment is manufactured by performing a magnetizing process of magnetizing the magnet materials after assembling the magnet materials to the rotor core 30 to form all the magnet materials as the magnets M1, M2, M3 respectively.

Figure 2:
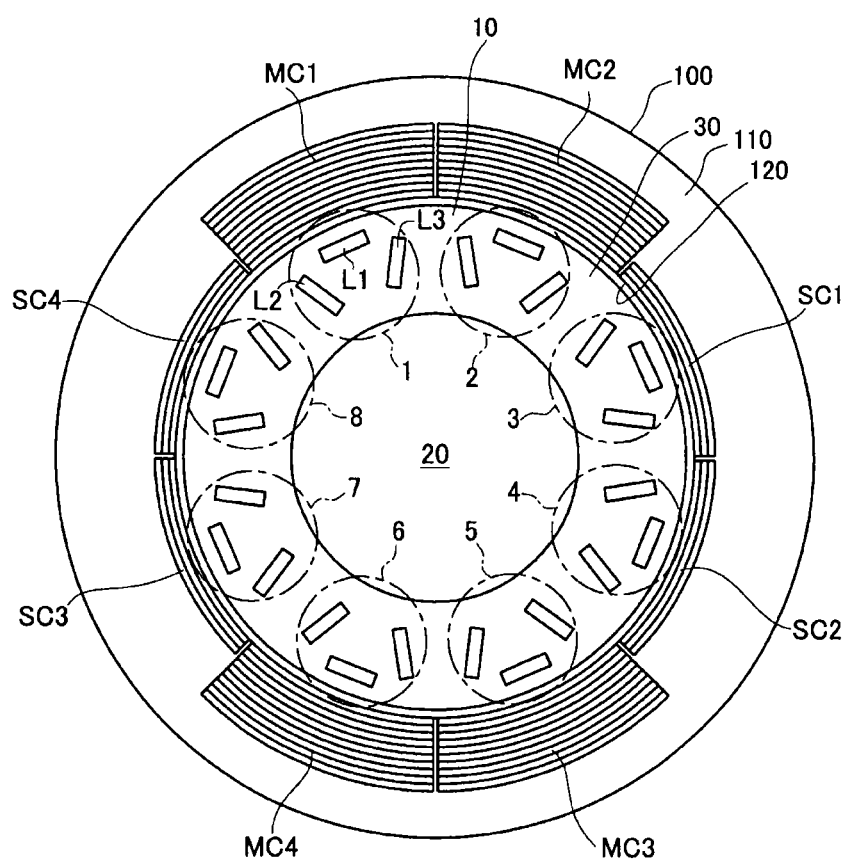
FIG. 2 is a schematic view of a magnetization device used in the magnetizing process of the first embodiment.

FIG. 2 shows the magnetization device 100 that can be used in the magnetizing process of the rotor 10. The magnetization device 100 includes a core portion 110; main coils MC1, MC2, MC3, MC4; and sub coils SC1, SC2, SC3, SC4. Note that hereinafter, when it is not particularly distinguished between the main coils MC1, MC2, MC3, MC4, they are referred to as main coils MC, and when it is not particularly distinguished between the sub coils SC1, SC2, SC3, SC4, they are referred to as sub coils SC. The main coils MC and the sub coils SC both can generate a magnetic field by being energized.

Further, as shown in FIG. 2, an insertion hole 120 is formed at the center of the magnetization device 100, and the rotor 10 is inserted into the insertion hole 120. The rotor 10 in FIG. 2 is a rotor before performing the magnetizing process by the magnetization device 100, and each of the magnet materials L1, L2, L3 which are assembled in the rotor core 30 is in an unmagnetized state. That is, the magnet materials L1, L2, L3 of the eight poles from group 1 to group 8 are assembled in the rotor core 30.

The main coils MC and the sub coils SC are arranged annularly side by side on the outer side of the insertion hole 120. Further, the magnetization device 100 according to the embodiment has eight main coils MC and sub coils SC. Then the magnet materials L1, L2, L3 of the groups 1 to 8 of the rotor 10 that is inserted into the insertion hole 120 face a main coil MC or a sub coil SC.

In this embodiment, the sub coils SC each have the same number of turns, and are coils with at least one or more turns.

Also, the main coils MC each have the same number of turns, and are coils with the number of turns greater than the sub coils SC. In this embodiment, the number of turns of the sub coils SC is set to 3, and the number of turns of the main coils MC is set to 15.

In addition, these coils are arranged in an order of the main coil MC1, the main coil MC2, the sub coil SC1, the sub coil SC2, the main coil MC3, the main coil MC4, the sub coil SC3, the sub coil SC4 in the clockwise direction in FIG. 2 from the main coil MC1. In other words, the main coil MC1 and the main coil MC2 are arranged between the sub coil SC4 and the sub coil SC1. Further, the main coil MC3 and the main coil MC4 are arranged between the sub coil SC2 and the sub coil SC3. That is, the magnetization device 100 according to the embodiment is configured to have two coil groups, each of which has two sub coils SC and two main coils MC sandwiched between the sub coils SC and which are arranged oppositely.

Therefore, the magnetization device 100 can apply an external magnetic field to the inside of the insertion hole 120 by energizing the main coils MC and the sub coils SC. Then the magnetization device 100 can magnetize the magnet materials L1, L2, L3 by applying the external magnetic field to the inside region in the insertion hole 120.

Further, the main coils MC and the sub coils SC are arranged such that winding directions of adjacent coils are opposite to each other. In addition, the main coils MC and the sub coils SC are all connected in series.

Figure 3:
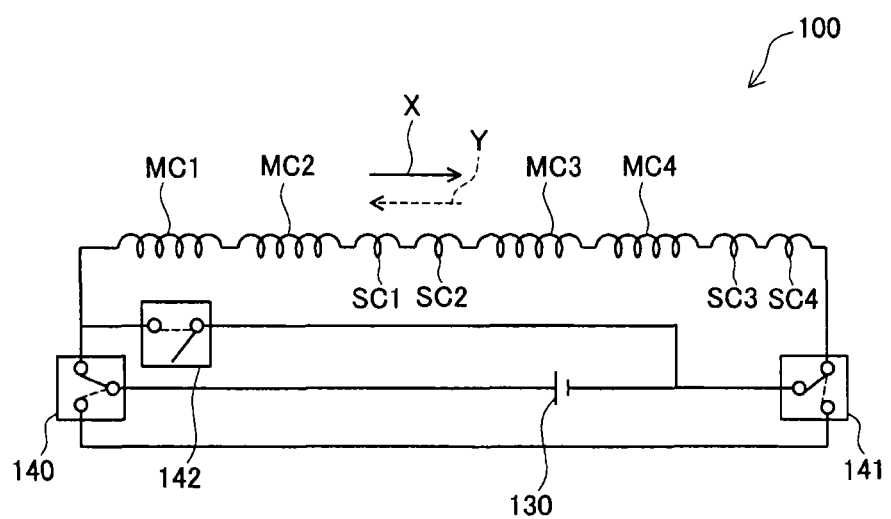
FIG. 3 is a circuit diagram of the magnetization device used in the magnetizing process of the first embodiment.

FIG. 3 shows a circuit diagram of the magnetization device 100. As shown in FIG. 3, the coils from the main coil MC1 on the left end to the sub coil SC4 on the right end are connected in series in this order in the clockwise direction as the arrangement in FIG. 2. As shown in FIG. 3, the magnetization device 100 has a power supply 130 and switches 140, 141 and 142.

When the switches 140, 141 and 142 are in a state shown by solid lines in FIG. 3, the power supply 130 causes a current to flow in a direction of an arrow X in the circuit connected with the main coils MC and the sub coils SC. On the other hand, by switching the switches 140, 141 and 142 to the positions shown by broken lines in FIG. 3, the current can flow in a direction of an arrow Y that is opposite to the arrow X. In other words, for the magnetization device 100 used in the magnetizing process according to the embodiment, by switching the switches 140, 141 and 142, the current can flow in the direction of the arrow X or in the direction of the arrow Y in the circuit connected with the main coils MC and the sub coils SC. Thus in this embodiment, in a state where the rotor 10 is inserted in a magnetization application region to which an external magnetic field can be applied by the magnetization device 100, that is, in the inside of the insertion hole 120 as shown in FIG. 2, the magnetizing process is performed by energizing the main coils MC and the sub coils SC.

Next, the magnetizing process according to the embodiment using the magnetization device 100 will be explained with reference to FIG. 4 to FIG. 7. In this embodiment, the magnetizing process is performed by a first partial magnetization, a second partial magnetization, a third partial magnetization and a fourth partial magnetization shown in FIG. 4, FIG. 5, FIG. 6 and FIG. 7 respectively. Each of the first to the fourth partial magnetizations is a magnetization that can form the magnets M1, M2, M3 from a portion of the plurality of magnet materials L1, L2, L3 that are assembled in the rotor 10. Thus in this embodiment, by performing the magnetizing process of the first to the fourth partial magnetizations, all of the magnet materials L1, L2, L3 are formed as the magnets M1, M2, M3. Firstly, the description will start from the first partial magnetization of this embodiment with reference to FIG. 4.

Figure 4:
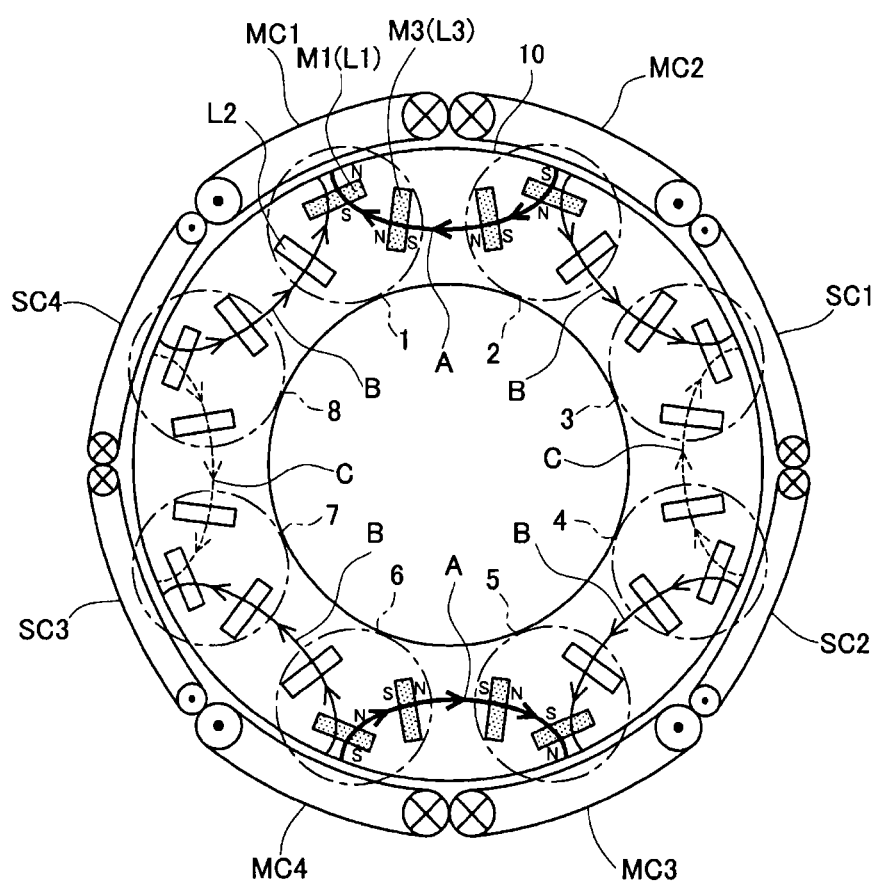
FIG. 4 is a diagram for explaining a first partial magnetization of the magnetizing process of the first embodiment.

As shown in FIG. 4, the first partial magnetization is performed in a state where the magnet materials L1, L2, L3 of group 1 face the main coil MC1. That is, in the first partial magnetization, the odd numbered groups 1, 3, 5, 7 with the N poles on the outer peripheral side of the rotor core 30 face the main coils MC1, MC3 and the sub coils SC1, SC3. For this reason, the even numbered groups 2, 4, 6, 8 with the S poles on the outer peripheral side of the rotor core 30 face the main coils MC2, MC4 and the sub coils SC2, SC4.

Further, the first partial magnetization is performed by causing the current to flow in the direction indicated by the arrow X in FIG. 3 with the power supply 130. As described above, the main coils MC and the sub coils SC are arranged such that winding directions of adjacent coils are opposite to each other. Therefore, the current flows in the main coils MC and the sub coils SC in the direction shown in FIG. 4 respectively by energizing. Then, by energizing the main coils MC and the sub coils SC, magnetic flux interlinking with two adjacent coils is generated. In FIG. 4, an outline of an external magnetic field that is generated in a magnetic field application region inside the insertion hole 120 when energizing the main coils MC and the sub coils SC is indicated by arrows in the figure as magnetic fields A, B, C.

That is, at a position where two main coils MC are adjacent to each other, the magnetic field A is generated in a direction from the inside of one to the inside of the other one. At a position where a main coil MC and a sub coil SC are adjacent, the magnetic field B is generated in a direction from the inside of one to the inside of the other one. In addition, at a position where two sub coils SC are adjacent to each other, the magnetic field C is generated in a direction from the inside of one to the inside of the other one.

The magnetic field A interlinks with two main coils MC having a large number of turns and therefore is a strong magnetic field with a high magnetic flux density. Specifically, the magnetic field A has a strength that can magnetize all of the magnet materials L1, L2, L3 that are arranged in the magnetic field A to the saturation point. Further, the magnetic field A interlinking between the two adjacent main coils MC is formed to extend to the positions of the magnet materials L2, L3 that are arranged in the radial inside of the rotor 10. In other words, with the arrangement of the adjacent main coils MC with a large number of turns, the magnetization device 100 can apply the strong magnetic field A even to the magnet materials L2, L3 that are arranged in the radial inside of the rotor 10 so as to magnetize them to saturation.

On the other hand, the magnetic field B is a magnetic field interlinking with a main coil MC and a sub coil SC with a number of turns less than the main coil MC and therefore has a magnetic flux density lower than the magnetic field A and is a magnetic field weaker than the magnetic field A. In other words, the strength of the magnetic field B cannot magnetize the magnet materials L1, L2, L3 to saturation. Further, since the magnetic field C interlinks with two sub coils SC having a small number of turns, the magnetic field C has a magnetic flux density even lower than the magnetic field B and is a weak magnetic field. Note that although the strengths of the magnetic field B and the magnetic field C cannot magnetize the magnet materials L1, L2, L3 to saturation, these strengths still may magnetize the magnet materials L1, L2, L3 more or less. Alternatively, the strengths of the magnetic field B and the magnetic field C may be strengths that cannot magnetize the magnet materials L1, L2, L3.

In FIG. 4, the magnets M1, M2, M3 that are magnetized to saturation by the applied magnetic field A are indicated by dot hatching. Meanwhile, the magnet materials L1, L2, L3 are not magnetized to saturation at this time by the applied magnetic fields B, C, and therefore are not indicated by dot hatching.

For example, the magnet material L1, L3 to which the magnetic field A is applied among the magnet material L1, L2, L3 of group 1 that faces the main coil MC1 are magnetized to saturation and become magnets M1, M3. On the other hand, the magnet material L2 of group 1 to which the magnetic field B is applied is not magnetized to saturation, and is still presented as a magnet material L2. Thus, in the first partial magnetization, a portion of the magnet materials L1, L2, L3 that are assembled in the rotor 10 can be magnetized to saturation.

Figure 5:
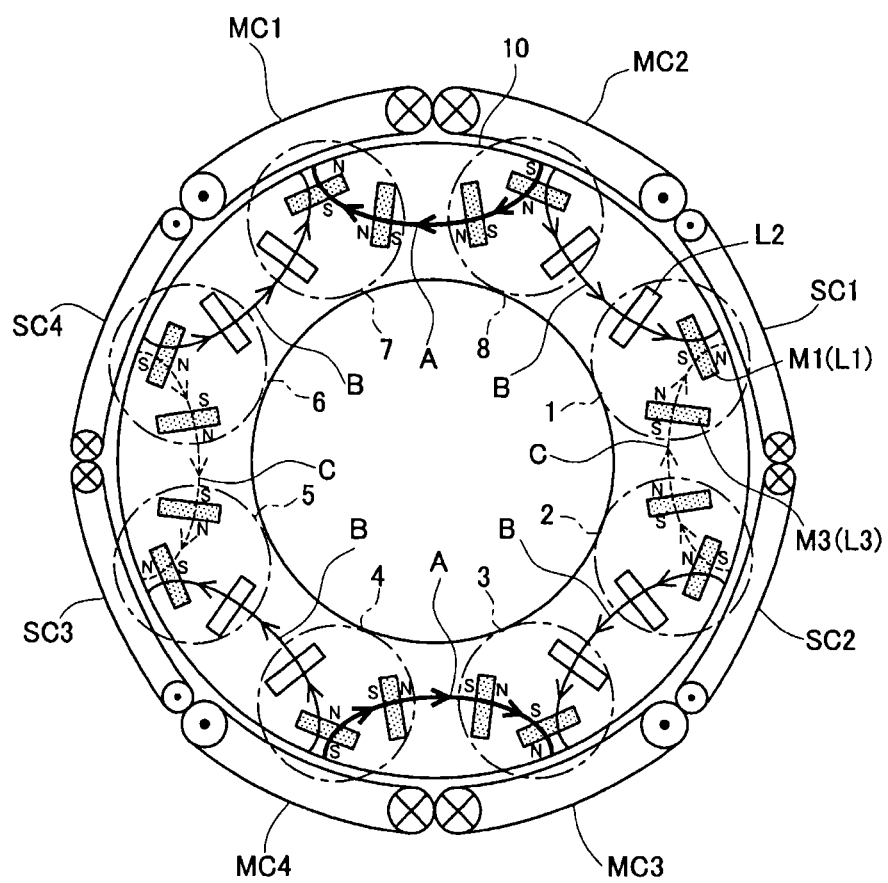
FIG. 5 is a diagram for explaining a second partial magnetization of the magnetizing process of the first embodiment.

Next, FIG. 5 is a diagram showing a state of the second partial magnetization. As shown in FIG. 5, the second partial magnetization is performed by causing the current to flow in the same direction as that in the first partial magnetization at a rotational position after the rotor 10 is rotated by 90° in the clockwise direction from the position of performing the first partial magnetization shown in FIG. 4. That is, after the first partial magnetization and before the second partial magnetization, the rotor 10 is rotated by 90° in the clockwise direction. As shown in FIG. 5, then second partial magnetization is performed by causing the current to flow in the direction indicated by the arrow X in FIG. 3 with the power supply 130 in a state where group 1 of the rotor 10 faces the sub coil SC1.

As described above, in the second partial magnetization, the current flows in the same direction as that in the first partial magnetization. Therefore, as shown in FIG. 5, the magnetic fields A, B, C that are generated by the main coils MC and the sub coils SC are the same as those in the first partial magnetization in FIG. 1. In addition, as shown in FIG. 5, in the second partial magnetization, the odd numbered groups 1, 3, 5, 7 with the N poles on the outer peripheral side of the rotor core 30 face the main coils MC1, MC3 and the sub coils SC1, SC3 as in the first partial magnetization. For this reason, in the second partial magnetization, the even numbered groups 2, 4, 6, 8 with the S poles on the outer peripheral side of the rotor core 30 face the main coils MC2, MC4 and the sub coils SC2, SC4 as in the first partial magnetization.

Further, in the second partial magnetization, as in the first partial magnetization, the magnet materials L1, L2, L3 at the position where the magnetic field A is applied are magnetized to saturation to form magnets M1, M2, M3. In FIG. 5, the magnets M1, M2, M3 that are magnetized to saturation are also indicated by dot hatching. That is, in addition to the magnets M1, M2, M3 that are magnetized to saturation by the first partial magnetization, the magnets M1, M2, M3 that are magnetized to saturation by the second partial magnetization are also indicated by dot hatching.

Figure 6:
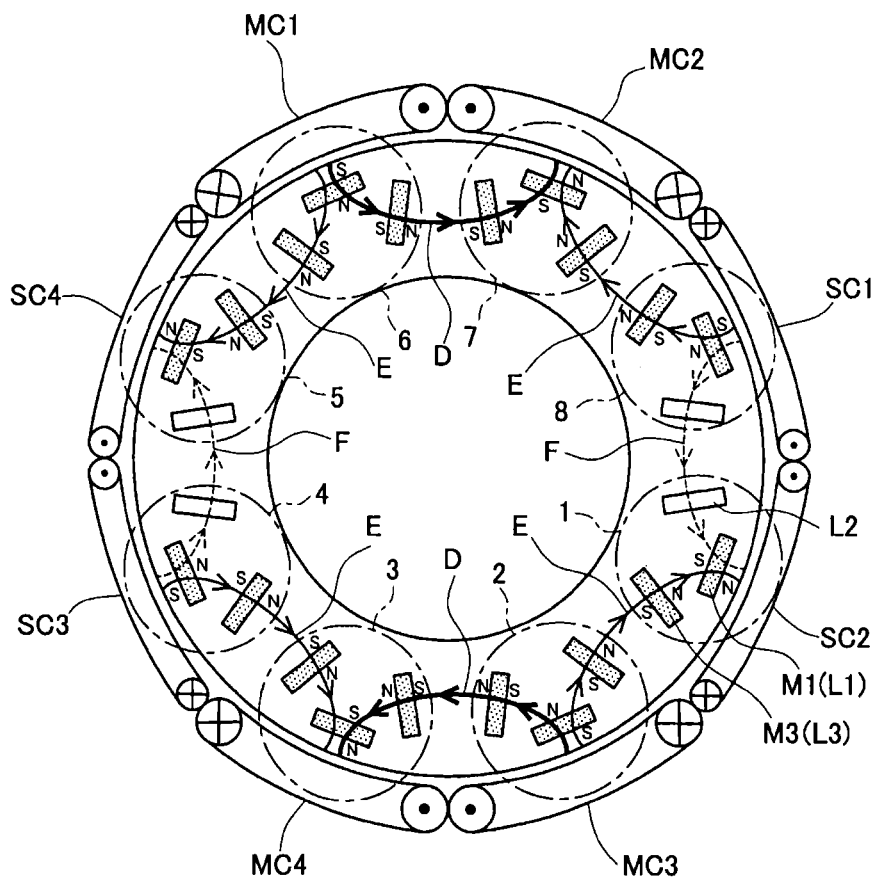
FIG. 6 is a diagram for explaining a third partial magnetization of the magnetizing process of the first embodiment.

Next, FIG. 6 is a diagram showing a state of the third partial magnetization. As shown in FIG. 6, the third partial magnetization is performed by causing the current to flow in an opposite direction to that in the first and second partial magnetizations at a rotational position after the rotor 10 is rotated by 45° in the clockwise direction from the position of performing the second partial magnetization shown in FIG. 5. That is, after the second partial magnetization and before the third partial magnetization, the rotor 10 is rotated by 45° in the clockwise direction. Further, the rotational position of the rotor 10 in the third partial magnetization shown in FIG. 6 is a position obtained by rotating by 135° in the clockwise direction from the rotational position in the first partial magnetization shown in FIG. 4. As shown in FIG. 6, then third partial magnetization is performed by causing the current to flow in the direction indicated by the arrow Y in FIG. 3 with the power supply 130 in a state where group 1 of the rotor 10 faces the sub coil SC2.

In the third partial magnetization, the current flows in the opposite direction to that in the first and second partial magnetizations. Therefore, as shown in FIG. 6, the current flows in the opposite direction to that in the main coils MC and the sub coils SC in the case of the first and second partial magnetizations shown in FIG. 4 and FIG. 5. Thus, in the third partial magnetization, as shown in FIG. 6, the magnetic fields D, E, F that are generated by the main coils MC and the sub coils SC are different from those in the first and second partial magnetizations as described above. Specifically, the magnetic fields D, E, F that are generated in the third partial magnetization have opposite directions to those of the magnetic fields A, B, C as described in the first and second partial magnetizations respectively. On the other hand, strengths and generation positions of the magnetic fields D, E, F are the same as those of the magnetic fields A, B, C respectively.

Here, the magnetic fields D, E, F that are generated in the third partial magnetization have opposite directions to those of the magnetic fields A, B, C. However, as shown in FIG. 6, in the third partial magnetization, through the rotation before the third partial magnetization, the poles that are close to the outer peripheral side of the rotor core 30 in the groups that face to the main coils MC and the sub coils SC are opposite to those in the case of the first and second partial magnetizations. That is, in the third partial magnetization, the directions of the generated magnetic fields D, E, F are opposite to the directions of the magnetic fields A, B, C, and opposite to the poles in the groups that face to the main coils MC and the sub coils SC.

Specifically, in the third partial magnetization, the odd numbered groups 1, 3, 5, 7 with the N poles on the outer peripheral side of the rotor core 30 face the main coils MC2, MC4 and the sub coils SC2, SC4. Further, in the third partial magnetization, the even numbered groups 2, 4, 6, 8 with the S poles on the outer peripheral side of the rotor core 30 face the main coils MC1, MC3 and the sub coils SC1, SC3.

Further, in the third partial magnetization, the magnet materials L1, L2, L3 to which the strong magnetic field D is applied are magnetized to saturation to form the magnets M1, M2, M3. In FIG. 6, the magnets M1, M2, M3 that are magnetized to saturation are also indicated by dot hatching. That is, in addition to the magnets M1, M2, M3 that are magnetized to saturation by the first and second partial magnetizations, the magnets M2, M3 that are magnetized to saturation by the third partial magnetization are also indicated by dot hatching. On the other hand, as the magnetic fields B, C, the magnetic fields E, F do not have enough strength to magnetize the magnet material L1, L2, L3 to saturation.

Figure 7:
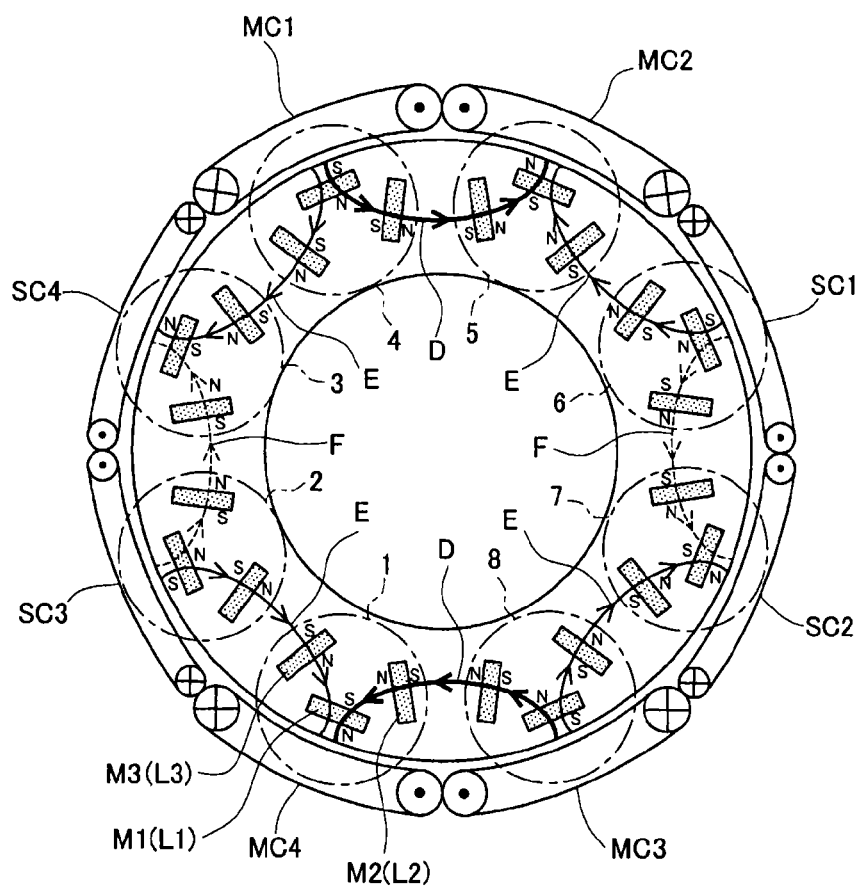
FIG. 7 is a diagram for explaining a fourth partial magnetization of the magnetizing process of the first embodiment.

Next, FIG. 7 is a diagram showing a state of the fourth partial magnetization. As shown in FIG. 7, the fourth partial magnetization is performed by causing the current to flow in an opposite direction to that in the first and second partial magnetizations at a rotational position after the rotor 10 is rotated by 90° in the clockwise direction from the position of performing the third partial magnetization shown in FIG. 6. That is, after the third partial magnetization and before the fourth partial magnetization, the rotor 10 is rotated by 90° in the clockwise direction. Further, the rotational position of the rotor 10 in the fourth partial magnetization shown in FIG. 7 is a position obtained by rotating by 225° in the clockwise direction from the rotational position in the first partial magnetization shown in FIG. 4. As shown in FIG. 7, then fourth partial magnetization is performed by causing the current to flow in the direction indicated by the arrow Y in FIG. 3 with the power supply 130 in a state where group 1 of the rotor 10 faces the main coil MC4.

That is, in the fourth partial magnetization, the current also flows in the same direction as that in the third partial magnetization. Therefore, as shown in FIG. 7, the magnetic fields D, E, F that are generated by the main coils MC and the sub coils SC are the same as those in the third partial magnetization in FIG. 3. In addition, as shown in FIG. 7, in the fourth partial magnetization, the odd numbered groups 1, 3, 5, 7 with the N poles on the outer peripheral side of the rotor core 30 face the main coils MC2, MC4 and the sub coils SC2, SC4 as in the third partial magnetization. For this reason, in the fourth partial magnetization, the even numbered groups 2, 4, 6, 8 with the S poles on the outer peripheral side of the rotor core 30 face the main coils MC1, MC3 and the sub coils SC1, SC3 as in the third partial magnetization.

Further, in the fourth partial magnetization, as in the third partial magnetization, the magnet materials L2, L3 to which the magnetic field D is applied are magnetized to saturation to form magnets M2, M3. In FIG. 7, the magnets M1, M2, M3 that are magnetized to saturation are also indicated by dot hatching. That is, in addition to the magnets M1, M2, M3 that are magnetized to saturation by the first to third partial magnetizations, the magnets M2, M3 that are magnetized to saturation by the fourth partial magnetization are also indicated by dot hatching.

As shown in FIG. 7, through the fourth partial magnetization, the remaining magnet materials L2, L3 are all magnetized to saturation. Therefore, through the magnetizing process of the first to fourth partial magnetizations as described above, all of the magnet materials L1, L2, L3 can be magnetized to saturation, and the eight-pole rotor 10 having eight groups of magnets M1, M2, M3 can be manufactured.

Here, in the first to third partial magnetizations, the magnetic fields B, C or magnetic fields E, F are applied to the magnet materials other than the magnet materials L1, L2, L3 that are magnetized targets in these partial magnetizations to which the magnetic field A or the magnetic field D is applied. However, the magnetic fields B, C, E, F have directions such that the magnet materials L1, L2, L3 to which these magnetic fields are applied are magnetized in the same direction as that of the polarization in the final product. Therefore, even if the magnetic fields B, C, E, F have enough strength to magnetize the unmagnetized magnet materials L1, L2, L3, there is no possibility that the magnet materials L1, L2, L3 are magnetized in the opposite direction to that of the polarization in the final product.

Also, in the second to fourth partial magnetizations, the magnetic fields B, C and the magnetic fields D, E, F that are different from those for magnetizing to saturation are applied to the magnets M1, M2, M3 that have been magnetized to saturation in a previous partial magnetization. However, the magnetic fields B, C, D, E, F that are applied to the magnets M1, M2, M3 that have been magnetized to saturation in a previous partial magnetization have the same directions as those of the magnetic fields A, D that are applied when magnetizing the magnets M1, M2, M3. Therefore, the magnets M1, M2, M3 that have been magnetized to saturation in a previous partial magnetization will not be affected by demagnetization or the like in the subsequent partial magnetization. In addition, even if the magnetic fields B, C, D, E, F having the same direction as those for magnetizing to saturation are applied to the magnets M1, M2, M3 that have been magnetized to saturation in a previous partial magnetization, the magnets M1, M2, M3 that have been magnetized to saturation will not be further magnetized.

Further, in the magnetization device 100 according to the embodiment, the main coils MC and sub coils SC are all connected in series. Therefore, the magnetic fields are generated at the same time by the main coils MC and the sub coils SC that are energized by the power supply 130 to form the magnetic fields A, B, C and the magnetic fields D, E, F at the same time, respectively. Then, as described above, the magnetic fields A, B, C, and the magnetic fields D, E, F are not applied to the unmagnetized magnet materials L1, L2, L3 or the magnets M1, M2, M3 that have been magnetized to saturation in such a direction that the unmagnetized magnet materials L1, L2, L3 or the magnets M1, M2, M3 that have been magnetized to saturation are magnetized in the opposite direction to that of the polarization in the final product.

For example, if the timing of generating magnetic fields by the main coils MC is slightly earlier than the timing of generating magnetic fields by the sub coils SC, magnetic flux generated by the main coils MC may be generated as leakage flux having different positions or directions from those of the magnetic fields A, B, C or the magnetic fields D, E, F. Such leakage flux is generated by the main coils MC and thus sometimes may have a certain degree of strength. Moreover, there is a possibility that the leakage magnetic flux is applied to the unmagnetized magnet materials L1, L2, L3 or the magnets M1, M2, M3 that have been magnetized to saturation in such a direction that the unmagnetized magnet materials L1, L2, L3 or the magnets M1, M2, M3 that have been magnetized to saturation are magnetized in the opposite direction to that of the polarization in the final product.

Then, if the leakage magnetic flux is applied to the unmagnetized magnet materials L1, L2, L3 in the opposite direction and the magnet materials L1, L2, L3 are magnetized in the opposite direction, it is necessary to magnetize reversely the magnets that have been magnetized in the opposite direction to saturation. However, it is difficult to magnetize reversely the magnets that have been magnetized once and are assembled in the rotor core 30 to saturation. Further, if the leakage magnetic flux is applied to the magnets M1, M2, M3 that have been magnetized to saturation in the opposite direction to demagnetize the magnets M1, M2, M3, an electric motor that is configured by assembling the rotor 10 to a stator in this case cannot function with the highest performance. Therefore, in this case, it needs to perform the magnetization again for magnetizing them to saturation.

Thus, in this embodiment, by matching the timings of generating the magnetic fields by the main coils MC and the sub coils SC, it is adapted to reliably control the magnetic fields that are generated by the main coils MC such that the situation as described above does not occur. That is, in the magnetizing process according to the embodiment, the strong magnetic fields A, B, D, E that are generated by the main coils MC always pass through the inside of the adjacent main coils MC or sub coils SC. Further, in the magnetization device 100, the main coils MC and sub coils SC are all connected in series and the number of the power supply 130 is one. Therefore, there is no need for a fine adjustment to the energizing timings for generating the magnetic fields at the same time by the main coils MC and the sub coil SC.

Moreover, for example, by forming all the sub coils SC in the magnetization device 100 to have the same number of turns as that of the main coils MC, it is possible to magnetize all the magnet materials L1, L2, L3 to saturation by one magnetization. However, the number of main coils MC is preferably as small as possible. As described above, all of the magnets M1, M2, M3 of the rotor 10 in this embodiment are magnets having a high magnetic flux density and thus having a strong magnetic force. Therefore, in order to magnetize the magnet materials L1, L2, L3 to saturation to form the magnets M1, M2, M3, it is necessary to apply a magnetic field with a certain intensity to the magnet materials L1, L2, L3.

That is, in a magnetization device that only uses the main coils MC, since the number of main coils MC with a large number of turns is increased, as an entire circuit, it is necessary to apply a very high voltage. Thus, it is necessary to use an expensive power supply as the power supply 130. Further, in the configuration only using the main coils MC, coating for the conductors therein shall be capable of withstanding a high voltage. In contrast, in this embodiment, it is possible to make the power supply 130 and the respective coils inexpensive.

In addition, as described above, in the magnetization device 100 according to the embodiment, the coil groups that are configured of the two sub coils SC and the two main coils MC sandwiched between the sub coils SC are arranged to face each other. Therefore, the second to fourth partial magnetizations as described above may also be performed in a state where the rotor 10 is further rotated by 180° from the respective rotational positions as described above with respect to the rotational position in the first partial magnetization.

That is, the second partial magnetization may be performed in a state where the rotor 10 is rotated by 90° or 270° in the clockwise direction from the rotational position of the rotor 10 in the first partial magnetization. Further, the third partial magnetization may be performed in a state where the rotor 10 is rotated by 135° or 315° in the clockwise direction from the rotational position of the rotor 10 in the first partial magnetization. Further, the fourth partial magnetization may be performed in a state where the rotor 10 is rotated by 45° or 225° in the clockwise direction from the rotational position of the rotor 10 in the first partial magnetization.

Furthermore, the first to fourth partial magnetizations may also be performed in a different order from that in the magnetizing process described above. For example, the fourth partial magnetization, the third partial magnetization, the second partial magnetization and the first partial magnetization may be performed in this order. However, it is preferable to continuously perform the first partial magnetization and the second partial magnetization and continuously perform the third partial magnetization and the fourth partial magnetization. This is because switching of the switches 140, 141, 142 may be performed once.

As described above in detail, in the method of manufacturing the rotor 10 according to this embodiment, by using the magnetization device 100, the magnetizing process of the first to fourth partial magnetizations are performed while the rotor 10 is rotated between the first to fourth partial magnetizations. In the magnetization device 100, on the outside of the magnetic field application region for applying the magnetic field to the rotor 10, the plurality of main coils MC and sub coils SC are arranged side by side in a manner that winding directions of adjacent coils are opposite to each other. Specifically, the main coils MC1, MC2 are arranged between the sub coils SC1, SC4. Moreover, the main coils MC3, MC4 are arranged between the sub coils SC2, SC3. In addition, the main coils MC and sub coils SC are all connected in series. Further, the magnetic fields A, B, C may be applied at the same timing and the magnetic fields D, E, F may be applied at the same timing. Thus, it is possible to manufacture the rotor 10 while reliably preventing the magnet materials L1, L2, L3 from being magnetized in the opposite directions respectively to those of the polarizations of the magnets M1, M2, M3 in the final product.

Note that this embodiment is merely illustrative and is not intended to limit the invention in any way. Accordingly, the invention may be modified and varied in various manners without departing from the scope of the subject matter of the invention. That is, for the magnetization device 100 of the above embodiment, the coil groups that are configured of the two sub coils SC and the two main coils MC sandwiched between the sub coils SC are arranged to face each other. Thus for example, a configuration where the coil groups that face each other are connected to different circuits may be formed as long as the two sub coils SC and the two main coils MC located between the two sub coils SC are all connected in series. In addition, in this case, the magnetic fields that are generated by the sub coils SC preferably have such strength that any one of the unmagnetized magnet materials L1, L2, L3 is magnetized. If the coil groups are formed as different circuit configurations from each other, there is a possibility that the timings of generating the magnetic fields by the coil groups cannot match. Therefore, there is a possibility that leakage flux is generated from the sub coils SC that are located at both ends of the coil groups.

Further, for example, although the rotor 10 is rotated between the respective partial magnetizations of the magnetizing process in the above embodiment, it is possible that the rotor 10 is fixed and the magnetization device 100 is rotated. Further, for example, the order of connecting the main coils MC and the sub coils SC is not limited to the order shown in FIG. 3. For example, the main coils MC and the sub coils SC may be connected alternately. Moreover, for example, although a case where the rotor 10 having three magnets M1, M2, M3 for each pole is manufactured has been described in the above embodiment, a rotor having one magnet or two magnets for each pole may be manufactured by the magnetizing process using the magnetization device 100. Alternatively, it is also applicable to the method of manufacturing a rotor having four or more magnets for each pole.

Further, obviously, the magnetization device 100 having the coil group according to the invention that is configured of two sub coils SC and a plurality of main coils MC located between the two sub coils SC in which the sub coils SC and the main coils are all connected in series may also applied to the method of manufacturing a rotor having less than eight poles on the outer periphery. In addition, the magnetization device 100 having the coil group according to the invention may also applied to the method of manufacturing a rotor having more than eight poles on the outer periphery.

Second Embodiment

Next, a second embodiment will be described. In this embodiment, the rotor to be manufactured is the same as the rotor of the first embodiment shown in FIG. 1. In the present embodiment, a magnetizing process of a magnetization device that is different from that of the first embodiment is used. Specifically, the magnetization device with the number and arrangement of the main coils and sub coils that are different from those of the first embodiment shown in FIG. 2 is used in the magnetizing process of this embodiment.

Figure 8:
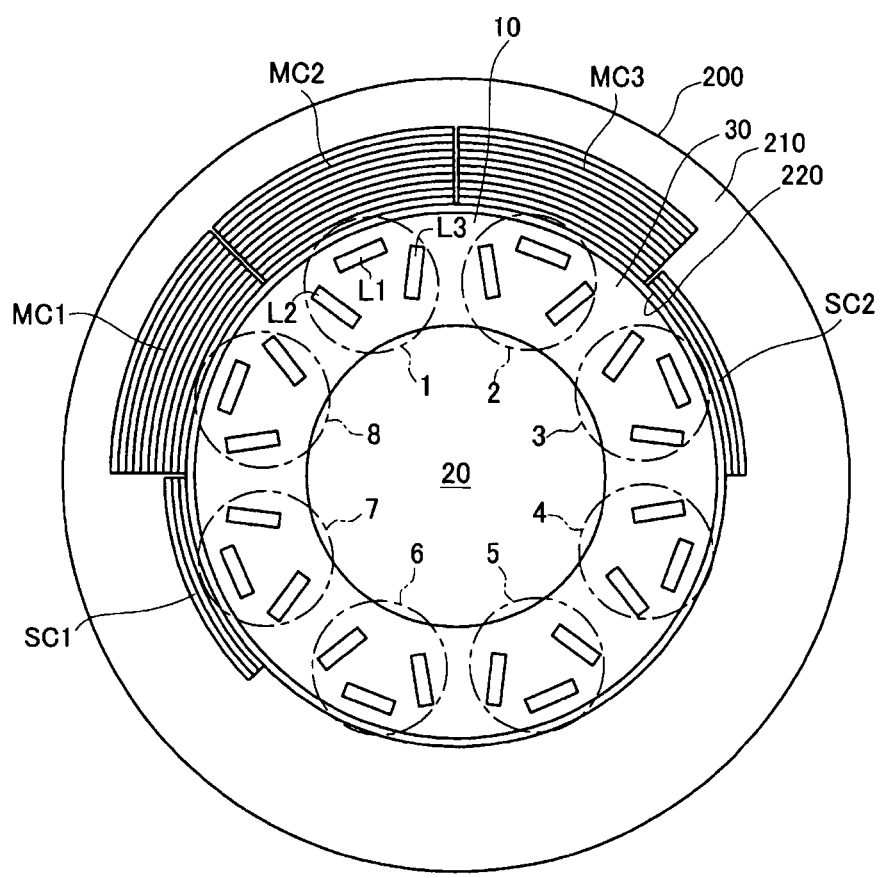
FIG. 8 is a schematic view of a magnetization device used in the magnetizing process of the second embodiment.

FIG. 8 shows a magnetization device 200 that is used in the magnetizing process of the second embodiment. The magnetization device 200 includes a core portion 210, main coils MC1, MC2, MC3, and sub coils SC1, SC2. In this embodiment, when it is not particularly distinguished between the main coils MC1, MC2, MC3, they are referred to as main coils MC, and when it is not particularly distinguished between the sub coils SC1, SC2, they are referred to as sub coils SC. Further, in this embodiment, each of the main coils MC and the sub coils SC may use the same coils as those in the first embodiment.

As shown in FIG. 8, the magnetization device 200 according to this embodiment has five coils including the main coils MC and the sub coils SC. Therefore, in comparison with the magnetization device 100 in the first embodiment shown in FIG. 2, the total number of the main coils MC and the sub coils SC is less. Further, in comparison with the magnetization device 100 in the first embodiment, the number of the main coils MC and the number of the sub coils SC are also less.

Further, in FIG. 8, the rotor 10 that is inserted into the insertion hole 220 at the center of the magnetization device 200 is a rotor that is in a state where the unmagnetized magnet materials L1, L2, L3 are assembled before the magnetizing process is performed. In the magnetization device 200, the main coils MC and the sub coils SC are arranged side by side outside the insertion hole 220. However, in comparison with the magnetization device 100 of the first embodiment, the total number of the main coils MC and the sub coils SC is less. Therefore, as shown in FIG. 8, the arrangement of the main coils MC and the sub coils SC in the magnetization device 200 is biased to one of them. Then, in FIG. 8, the magnet materials L1, L2, L3 of group 1 to group 3, group 7, group 8 of the rotor 10 that is inserted into the insertion hole 220 face to the main coils MC or the sub coils SC. On the other hand, the magnet materials L1, L2, L3 of group 4 to group 6 do not face to any one of the main coils MC or the sub coils SC.

Moreover, in this embodiment, from the sub coil SC1, the sub coil SC1, the main coil MC1, the main coil MC2, the main coil MC3, the sub coil SC2 are arranged in this order in the clockwise direction in FIG. 8. That is, the main coils MC1, MC2, MC3 are arranged between the sub coils SC1 and the sub coil SC2.

Further, in this embodiment, as in the first embodiment, the main coils MC and the sub coils SC are arranged such that winding directions of adjacent coils are opposite to each other. In addition, the main coils MC and the sub coils SC are all connected in series.

Figure 9:
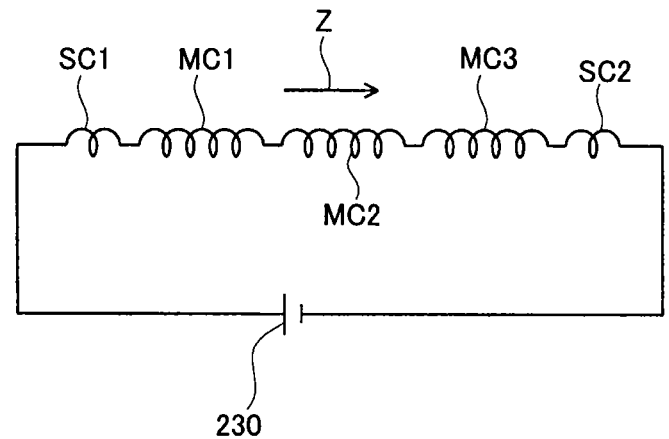
FIG. 9 is a circuit diagram of the magnetization device used in the magnetizing process of the second embodiment.

Further, FIG. 9 shows a circuit diagram of the magnetization device 200 according to this embodiment. As shown in FIG. 9, in the magnetization device 200, the coils from the sub coil SC1 on the left to the sub coil SC2 on the right are connected in series in this order in the clockwise direction as the arrangement in FIG. 8. In addition, as shown in FIG. 9, in the circuit of the magnetization device 200 according to this embodiment, the switches as in the first embodiment shown in FIG. 3 are not provided. Therefore, a power supply 230 causes a current to flow only in the direction indicated by the arrow Z in the circuit connected with coils in the magnetization device 200.

Next, the magnetizing process according to the embodiment using the magnetization device 200 will be explained with reference to FIG. 10 to FIG. 13. The magnetizing process is performed by first to fourth partial magnetizations shown in FIG. 10 to FIG. 13 respectively in this embodiment. In this embodiment, each of the first to the fourth partial magnetizations is a magnetization that can form the magnets M1, M2, M3 from a portion of the plurality of magnet materials L1, L2, L3 that are assembled in the rotor 10. Thus in this embodiment, by performing the magnetizing process of the first to the fourth partial magnetizations, all of the magnet materials L1, L2, L3 are formed as the magnets M1, M2, M3. However, the first to the fourth partial magnetizations of this embodiment are different from those of the first embodiment respectively. Firstly, the description will start from the first partial magnetization of this embodiment with reference to FIG. 10.

Figure 10:
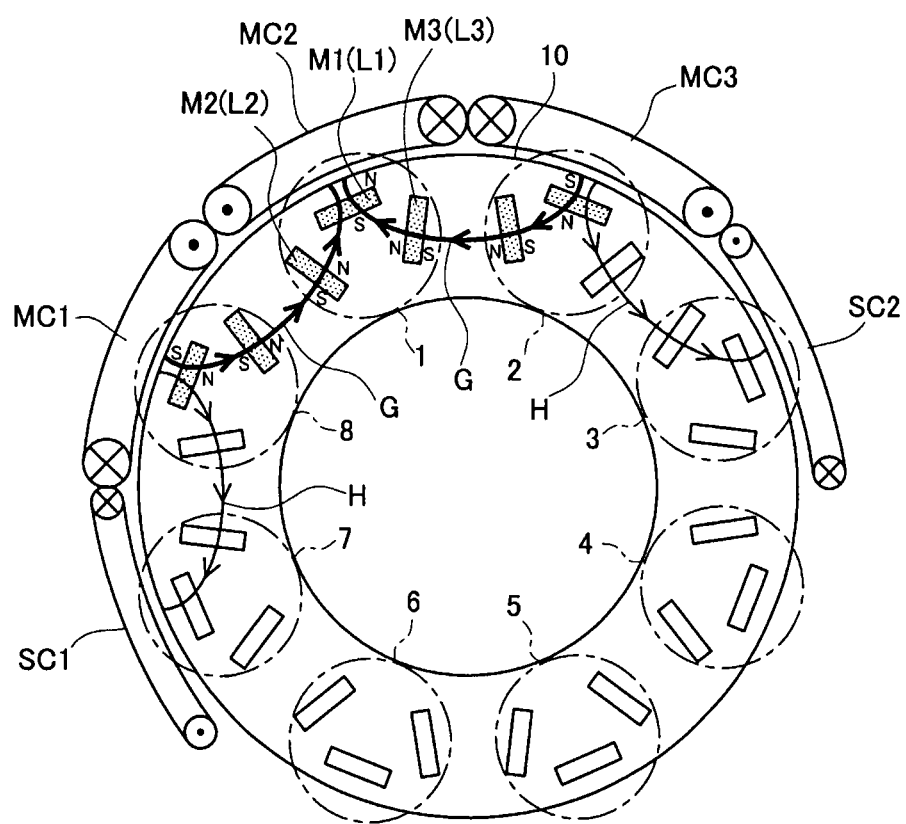
FIG. 10 is a diagram for explaining a first partial magnetization of the magnetizing process of the second embodiment.

As shown in FIG. 10, the first partial magnetization is performed in a state where group 1 of the rotor 10 faces the main coil MC2 by causing the current to flow with the power supply 230. That is, in the first partial magnetization, the odd numbered groups 1, 3, 7 with the N poles on the outer peripheral side of the rotor core 30 face the main coil MC2 and the sub coils SC1, SC2. For this reason, the even numbered groups 2, 8 with the S poles on the outer peripheral side of the rotor core 30 face the main coils MC1, MC3.

Further, in this embodiment, magnetic flux interlinking with two adjacent coils is generated by energizing the main coils MC and the sub coils SC. In FIG. 10, an outline of an external magnetic field that is generated in a magnetic field application region inside the insertion hole 220 when energizing the main coils MC and the sub coils SC is indicated by arrows in the figure as magnetic fields G, H. That is, at a position where two main coils MC are adjacent to each other, the magnetic field G is generated in a direction from the inside of one to the inside of the other one. At a position where a main coil MC and a sub coil SC are adjacent, the magnetic field H is generated in a direction from the inside of one to the inside of the other one.

In this embodiment, the magnetic field G that interlinks with two main coils MC having a large number of turns is a strong magnetic field that can magnetize all the magnet materials L1, L2, L3 to the saturation point. Also, the magnetic field G is applied to the magnet materials L2, L3 that are arranged on the radial inside of the rotor 10. On the other hand, the magnetic field H is a magnetic field that interlinks with a main coil MC and a sub coil SC and thus is weaker than the magnetic field G. In other words, the strength of the magnetic field H cannot magnetize the magnet materials L1, L2, L3 to saturation.

Further, in FIG. 10, the magnets M1, M2, M3 that are magnetized to saturation by the applied magnetic field G are indicated by dot hatching. On the other hand, the magnet materials L1, L2, L3 to which only the magnetic field H is applied are not magnetized to saturation, and therefore are not indicated by dot hatching. Further, the magnet materials L1, L2, L3 to which none of the magnetic fields G, H is applied are not magnetized to saturation, and therefore are not indicated by dot hatching. That is, as shown in FIG. 10, in the first partial magnetization according to this embodiment, a portion of the magnet materials L1, L2, L3 that are assembled in the rotor 10 are magnetized to saturation.

Figure 11:
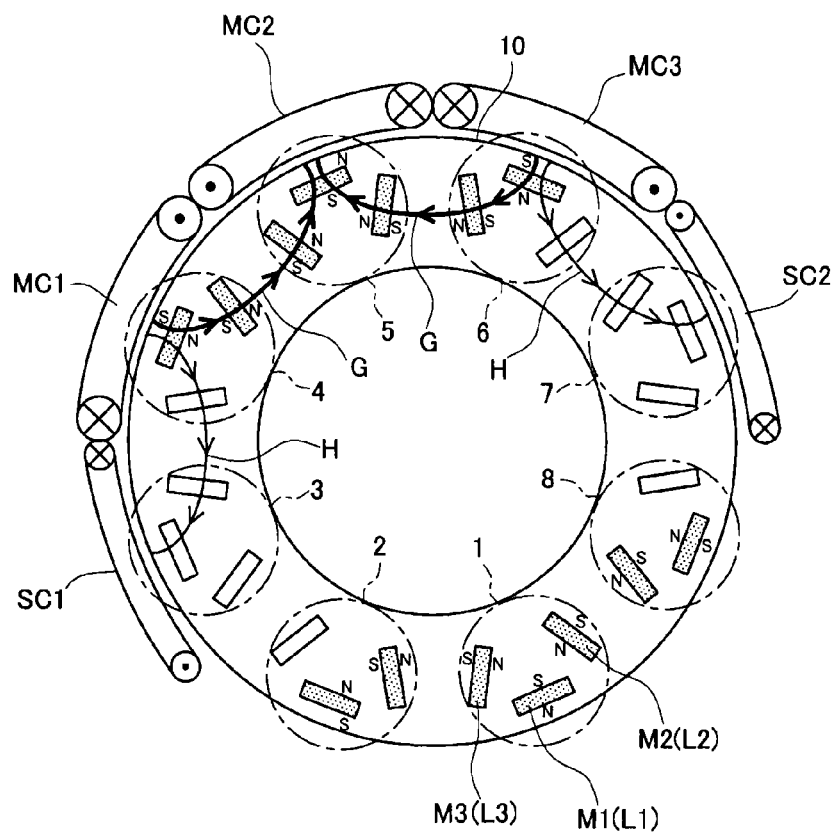
FIG. 11 is a diagram for explaining a second partial magnetization of the magnetizing process of the second embodiment.

Next, FIG. 11 is a diagram showing a state of the second partial magnetization. As shown in FIG. 11, the second partial magnetization is performed by causing the current to flow in the same direction as that in the first partial magnetization at a rotational position after the rotor 10 is rotated by 180° in the clockwise direction from the position of performing the first partial magnetization shown in FIG. 10.

That is, after the first partial magnetization and before the second partial magnetization, the rotor 10 is rotated by 180° in the clockwise direction. As shown in FIG. 11, then second partial magnetization is performed by causing the current to flow in the direction indicated by the arrow Z in FIG. 9 with the power supply 230 in a state where group 5 of the rotor 10 faces the main coil MC2.

As described above, in the second partial magnetization, the current also flows in the same direction as that in the first partial magnetization. Therefore, as shown in FIG. 11, the magnetic fields G H that are generated by the main coils MC and the sub coils SC are the same as those in the first partial magnetization in FIG. 10. In addition, as shown in FIG. 11, in the second partial magnetization, the odd numbered groups 3, 5, 7 with the N poles on the outer peripheral side of the rotor core 30 face the main coils MC2 and the sub coils SC1, SC2 as in the first partial magnetization. For this reason, in the second partial magnetization, the even numbered groups 4, 6 with the S poles on the outer peripheral side of the rotor core 30 face the main coils MC1, MC3 as in the first partial magnetization.

Further, in the second partial magnetization, as in the first partial magnetization, the magnet materials L1, L2, L3 at the positions to which the magnetic field G is applied are magnetized to saturation to form magnets M1, M2, M3. In FIG. 11, the magnets M1, M2, M3 that are magnetized to saturation are also indicated by dot hatching. That is, in addition to the magnets M1, M2, M3 that are magnetized to saturation by the first partial magnetization, the magnets M1, M2, M3 that are magnetized to saturation by the second partial magnetization are also indicated by dot hatching.

Figure 12:
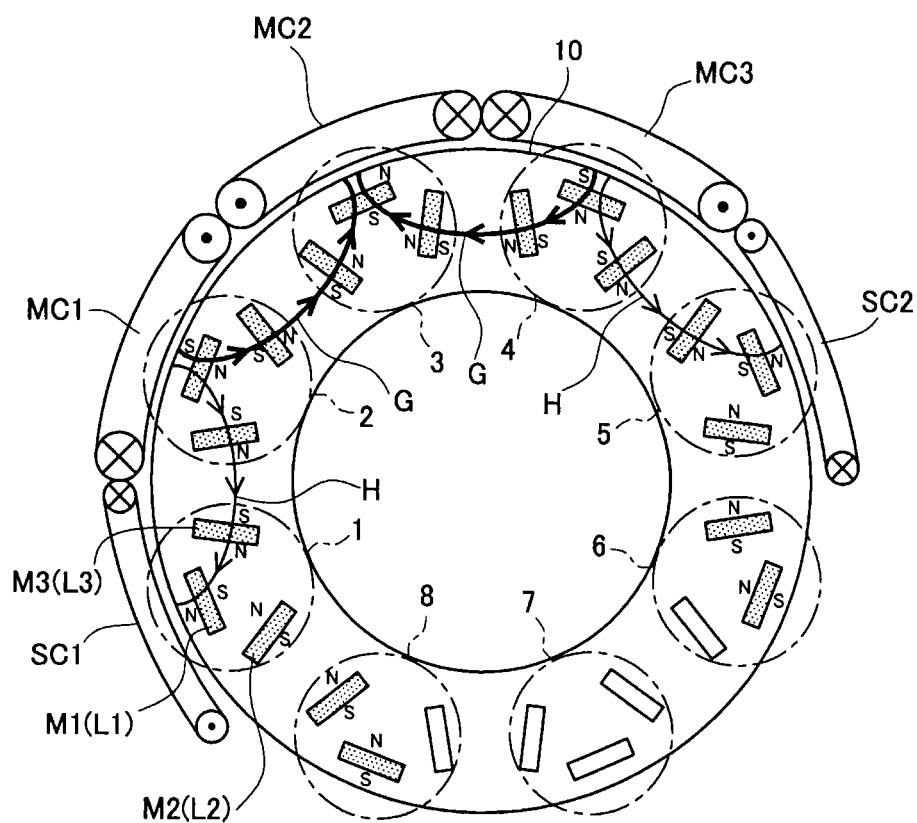
FIG. 12 is a diagram for explaining a third partial magnetization of the magnetizing process of the second embodiment.

Next, FIG. 12 is a diagram showing a state of the third partial magnetization. As shown in FIG. 12, the third partial magnetization is performed by causing the current to flow in the same direction as that in the first and second partial magnetizations at a rotational position after the rotor 10 is rotated by 90° in the clockwise direction from the position of performing the second partial magnetization shown in FIG. 11. That is, after the second partial magnetization and before the third partial magnetization, the rotor 10 is rotated by 90° in the clockwise direction. Further, the rotational position of the rotor 10 in the third partial magnetization shown in FIG. 12 is a position obtained by rotating by 270° in the clockwise direction from the rotational position in the first partial magnetization shown in FIG. 10. As shown in FIG. 12, then third partial magnetization is performed by causing the current to flow in the direction indicated by the arrow Z in FIG. 9 with the power supply 230 in a state where group 3 of the rotor 10 faces the main coil MC2.

In the third partial magnetization, the current also flows in the same direction as that in the first and second partial magnetizations. Therefore, as shown in FIG. 12, the magnetic fields H that are generated by the main coils MC and the sub coils SC are the same as those in the first partial magnetization in FIG. 10. In addition, as shown in FIG. 12, in the third partial magnetization, the odd numbered groups 1, 3, 5 with the N poles on the outer peripheral side of the rotor core 30 face the main coils MC2 and the sub coils SC1, SC2 as in the first and second partial magnetizations. For this reason, in the third partial magnetization, the even numbered groups 2, 4 with the S poles on the outer peripheral side of the rotor core 30 face the main coils MC1, MC3 as in the first and second partial magnetizations.

Further, in the third partial magnetization, as in the first and second partial magnetizations, the magnet materials L1, L2, L3 at the positions to which the magnetic field G is applied are magnetized to saturation to form magnets M1, M2, M3. In FIG. 12, the magnets M1, M2, M3 that are magnetized to saturation are also indicated by dot hatching. That is, in addition to the magnets M1, M2, M3 that are magnetized to saturation by the first and second partial magnetizations, the magnets M1, M2, M3 that are magnetized to saturation by the third partial magnetization are also indicated by dot hatching.

Figure 13:
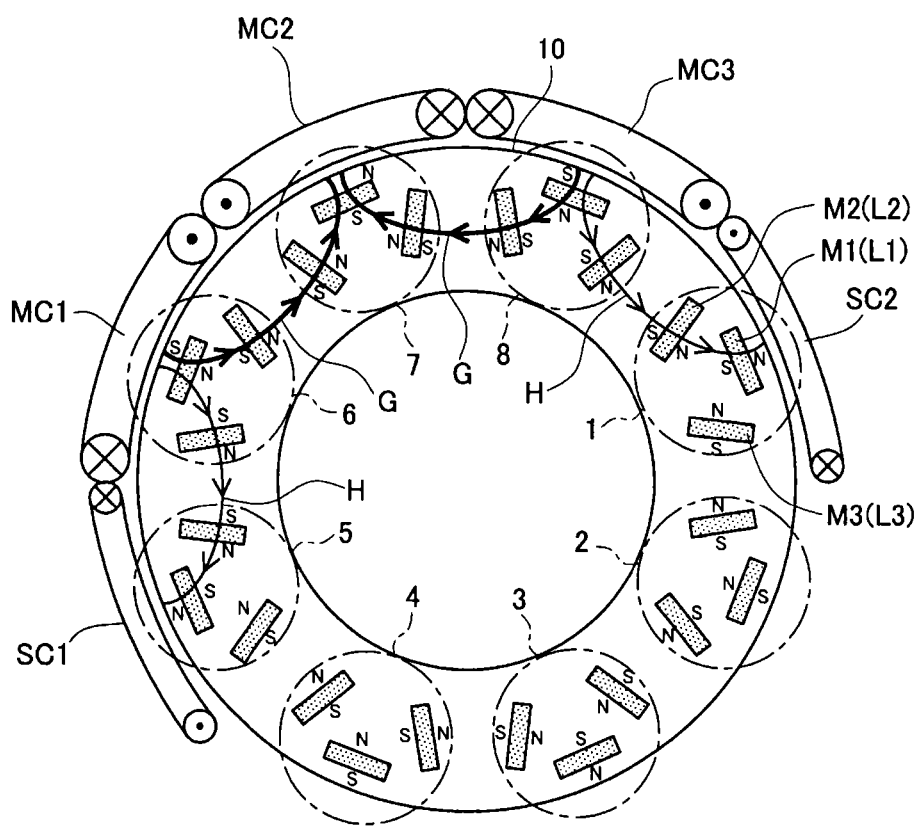
FIG. 13 is a diagram for explaining a fourth partial magnetization of the magnetizing process of the second embodiment.

Next, FIG. 13 is a diagram showing a state of the fourth partial magnetization. As shown in FIG. 13, the fourth partial magnetization is performed by causing the current to flow in the same direction as that in the first to third partial magnetizations at a rotational position after the rotor 10 is rotated by 180° in the clockwise direction from the position of performing the third partial magnetization shown in FIG. 12. That is, after the third partial magnetization and before the fourth partial magnetization, the rotor 10 is rotated by 180° in the clockwise direction. Further, the rotational position of the rotor 10 in the fourth partial magnetization shown in FIG. 13 is a position obtained by rotating by 90° in the clockwise direction from the rotational position in the first partial magnetization shown in FIG. 10. As shown in FIG. 13, then fourth partial magnetization is performed by causing the current to flow in the direction indicated by the arrow Z in FIG. 9 with the power supply 230 in a state where group 7 of the rotor 10 faces the main coil MC2.

In the fourth partial magnetization, the current also flows in the same direction as that in the first to third partial magnetizations. Therefore, as shown in FIG. 13, the magnetic fields G, H that are generated by the main coils MC and the sub coils SC are the same as those in the first partial magnetization in FIG. 10. In addition, as shown in FIG. 13, in the fourth partial magnetization, the odd numbered groups 1, 5, 7 with the N poles on the outer peripheral side of the rotor core 30 face the main coils MC2 and the sub coils SC1, SC2 as in the first to third partial magnetizations. For this reason, in the fourth partial magnetization, the even numbered groups 6, 8 with the S poles on the outer peripheral side of the rotor core 30 face the main coils MC1, MC3 as in the first to third second partial magnetizations.

Further, in the fourth partial magnetization, as in the first to third partial magnetizations, the magnet materials L1, L2, L3 at the positions to which the magnetic field G is applied are magnetized to saturation to form magnets M1, M2, M3. In FIG. 13, the magnets M1, M2, M3 that are magnetized to saturation are also indicated by dot hatching. That is, in addition to the magnets M1, M2, M3 that are magnetized to saturation by the first to third partial magnetizations, the magnets M1, M2, M3 that are magnetized to saturation by the fourth partial magnetization are also indicated by dot hatching.

Thus, as shown in FIG. 13, through the fourth partial magnetization, the remaining magnet materials L1, L2, L3 are all magnetized to saturation. Therefore, through the magnetizing process of the first to fourth partial magnetizations according to this embodiment as described above, all of the magnet materials L1, L2, L3 can be magnetized to saturation, and the eight-pole rotor 10 having eight groups of magnets M1, M2, M3 can be manufactured.

Here, in the first and second partial magnetizations, the magnetic field H is applied to the magnet materials other than the magnet materials L1, L2, L3 that are magnetized targets in these partial magnetizations to which the magnetic field G is applied. However, the magnetic field H has a direction such that the magnet materials L1, L2, L3 to which this magnetic field is applied are magnetized in the same direction as that of the polarization in the final product. Therefore, even if the magnetic field H has enough strength to magnetize the unmagnetized magnet materials L1, L2, L3, there is no possibility that the magnet materials L1, L2, L3 are magnetized in the opposite direction to that of the polarization in the final product.

Also, in the third and fourth partial magnetizations, the magnetic fields G, H that are different from those for magnetizing to saturation are applied to the magnets M1, M2, M3 that have been magnetized to saturation in a previous partial magnetization. However, the magnetic fields G, H that are applied to the magnets M1, M2, M3 that have been magnetized to saturation in a previous partial magnetization have the same directions as that of the magnetic field G that is applied when magnetizing the magnets M1, M2, M3. Therefore, the magnets M1, M2, M3 that have been magnetized to saturation in a previous partial magnetization will not be affected by demagnetization or the like in the subsequent partial magnetization. In addition, even if the magnetic fields G, H having the same direction as those for magnetizing to saturation are applied to the magnets M1, M2, M3 that have been magnetized to saturation in a previous partial magnetization, the magnets M1, M2, M3 that have been magnetized to saturation will not be further magnetized.

Further, in the magnetization device 200 according to the embodiment, the main coils MC and sub coils SC are all connected in series. Therefore, the magnetic fields G, H can also be generated at the same time in this embodiment. Further, as described above, the magnetic fields G, H are not applied in such a direction that the unmagnetized magnet materials L1, L2, L3 or the magnets M1, M2, M3 that have been magnetized to saturation are magnetized in the opposite direction to that of the polarization in the final product.

Thus, in the magnetizing process according to this embodiment, the strong magnetic field G, H which are generated by the main coils MC always pass through the inside of adjacent main coils MC or sub coils SC. That is, in this embodiment, it is possible to reliably control the magnetic field that is generated by the main coils MC by matching the timings of generating the magnetic fields by the main coils MC and the sub coils SC.

Further, in the magnetizing process according to the second embodiment, the magnetization device 200 having the number of the main coils MC and the sub coils SC less than that of the magnetization device 100 of the first embodiment is used. Thus, in the magnetization device 200 according to the second embodiment, the magnetic field G having the same strength as those of the magnetic fields A, D that are generated by the magnetization device 100 according to the first embodiment can be generated at a low voltage. That is, in the second embodiment, it is possible to use a power supply cheaper than the power supply 130 used in the first embodiment as the power supply 230.

Further, in the magnetizing process according to the second embodiment, all of the first to fourth partial magnetizations can be performed by causing the current to flow in the same direction in the main coils MC and the sub coils SC. Accordingly, in the magnetization device 200 according to the second embodiment, there is no need for a structure corresponding to the switches 140, 141, 142 of the magnetization device 100 of the first embodiment for switching the flow direction of the current. Therefore, in the second embodiment, it is possible to inexpensively configure the magnetization device 200.

Further, in the magnetization device 200 according to this embodiment, magnetic flux interlinking only with the sub coils SC is also generated on the side of the sub coils SC opposite to the main coils MC. Thus, it is preferable that the magnetic flux interlinking only with the sub coils SC will not magnetize the unmagnetized magnet materials L1, L2, L3. This is used for preventing the unmagnetized magnet materials L1, L2, L3 from being magnetized when the magnetic flux is applied to the magnet materials L1, L2, L3 in the opposite direction.

As described above in detail, in the method of manufacturing the rotor 10 according to this embodiment, using the magnetization device 200 that is different from that of the first embodiment, the magnetizing process of the first to fourth partial magnetizations that is different from that of the first embodiment are performed while the rotor 10 is rotated between the first to fourth partial magnetizations. In the magnetization device 200, on the outside of the magnetic field application region for applying the magnetic field to the rotor 10, the plurality of main coils MC and sub coils SC are also arranged side by side in a manner that winding directions of adjacent coils are opposite to each other. Specifically, the main coils MC1, MC2, MC3 are arranged between the sub coils SC1, SC2. In addition, the main coils MC and sub coils SC are all connected in series. Therefore, the magnetic fields G, H may be applied at the same timing. Thus, it is possible to manufacture the rotor 10 while reliably preventing the magnet materials L1, L2, L3 from being magnetized in the opposite directions respectively to those of the polarizations of the magnets M1, M2, M3 in the final product.

Note that this embodiment is merely illustrative and is not intended to limit the invention in any way. Accordingly, the invention may be modified and varied in various manners without departing from the scope of the subject matter of the invention. That is, in the magnetization device 200 of the above embodiment, the direction of the current flowing through the main coils MC and the sub coils SC in the magnetizing process is not limited to the direction shown in FIG. 10 to FIG. 13. Obviously, it is possible to manufacture a rotor that is the same as that of the above embodiment by performing the magnetizing process of the partial magnetizations while causing the current to flow in the opposite direction to that shown in FIG. 10 to FIG. 13.

Further, for example, although the rotor 10 is rotated between the respective partial magnetizations of the magnetizing process in the above embodiment, it is possible that the rotor 10 is fixed and the magnetization device 100 is rotated. Further, for example, the order of connecting the main coils MC and the sub coils SC is not limited to the order shown in FIG. 9. For example, the main coils MC and the sub coils SC may be connected alternately. Moreover, for example, although a case where the rotor 10 having three magnets M1, M2, M3 for each pole is manufactured has been described in the above embodiment, a rotor having one magnet or two magnets for each pole may be manufactured by the magnetizing process using the magnetization device 200. Alternatively, it is also applicable to the method of manufacturing a rotor having four or more magnets for each pole.

Further, obviously, the magnetization device 200 having the coil group according to the invention that is configured of two sub coils SC and a plurality of main coils MC located between the two sub coils SC in which the sub coils SC and the main coils are all connected in series may also applied to the method of manufacturing a rotor having less than eight poles on the outer periphery. In addition, the magnetization device 200 having the coil group according to the invention may also applied to the method of manufacturing a rotor having more than eight poles on the outer periphery.

What is claimed is:

1. A method of manufacturing a rotor, comprising:
arranging a rotor core in which a plurality of magnet materials are assembled in a magnetic field application region of a magnetization device; and
manufacturing a rotor by performing a magnetizing process, wherein an external magnetic field is generated in the magnetic field application region by the magnetization device in the magnetizing process to magnetize the magnet materials,
wherein the magnetization device has a coil group that is configured of a plurality of coils for generating a magnetic field by being energized, which are disposed side by side outside the magnetic field application region in a manner that winding directions of adjacent coils are opposite to each other,
wherein the coil group is configured of sub coils that are located at both ends among the plurality of coils and two or more main coils that have a number of turns higher than the sub coils and are located between the sub coils at both ends,
wherein the coils in the coil group are all connected in series,
wherein a plurality of partial magnetizations are performed in the magnetizing process, in each of the partial magnetizations the coil group is energized in a state of arranging the rotor core in the magnetic field application region of the magnetization device to generate an external magnetic field, so as to magnetize a group of adjacent magnet materials which form portions of the rotor core among the plurality of magnet materials to which magnetic flux interlinking with adjacent main coils is applied, and
wherein one of the coil group and the rotor core is rotationally moved around an axis of the rotor core between the plurality of partial magnetizations to magnetize all the plurality of magnet materials.

2. The method of manufacturing the rotor according to claim 1, wherein for each pole, the rotor has a first magnet that is arranged to face an outer peripheral surface of the rotor core, and second and third magnets that both are arranged to incline with respect to a radial direction of the rotor core and to become far away from each other as closing to a radial outside of the rotor core and that face a surface of the first magnet closing to an inner peripheral side of the rotor core.

3. The method of manufacturing the rotor according to claim 1, wherein the magnetization device has two of the coil groups, each of the coil groups has two of the main coils, and a current is capable of flowing in a circuit connected to the coil groups in a first direction and a second direction that is opposite to the first direction,
wherein a first partial magnetization, a second partial magnetization, a third partial magnetization and a fourth partial magnetization are performed in the magnetizing process in a state of arranging the rotor core in which magnet materials of eight poles are assembled in the magnetic field application region of the magnetization device, so as to magnetize all the magnet materials of the eight poles,
in the first partial magnetization, the current is caused to flow in the first direction,
in the second partial magnetization, at a rotational position after a position of the rotor core with respect to the coil groups is rotated by 90° or 270° in a first rotation direction from a first position relationship, the current is caused to flow in the first direction, wherein the first position relationship is a position relationship between the rotor core and the coil groups in the first partial magnetization,
in the third partial magnetization, at a rotational position after the position of the rotor core with respect to the coil groups is rotated by 135° or 315° in the first rotation direction from the first position relationship, the current is caused to flow in the second direction,
in the fourth partial magnetization, at a rotational position after the position of the rotor core with respect to the coil groups is rotated by 45° or 225° in the first rotation direction from the first position relationship, the current is caused to flow in the second direction.

4. The method of manufacturing the rotor according to claim 3, wherein the two of the coil groups are connected in series.

5. The method of manufacturing the rotor according to claim 1, wherein the magnetization device has one of the coil group, the coil groups has three of the main coils, and a current is capable of flowing in a circuit connected to the coil group in a first direction,
wherein a first partial magnetization, a second partial magnetization, a third partial magnetization and a fourth partial magnetization are performed in the magnetizing process in a state of arranging the rotor core in which magnet materials of eight poles are assembled in the magnetic field application region of the magnetization device, so as to magnetize all the magnet materials of the eight poles,
in the first partial magnetization, the current is caused to flow in the first direction,
in the second partial magnetization, at a rotational position after a position of the rotor core with respect to the coil group is rotated by 180° in a first rotation direction from a first position relationship, the current is caused to flow in the first direction, wherein the first position relationship is a position relationship between the rotor core and the coil group in the first partial magnetization,
in the third partial magnetization, at a rotational position after the position of the rotor core with respect to the coil group is rotated by 270° in the first rotation direction from the first position relationship, the current is caused to flow in the first direction,
in the fourth partial magnetization, at a rotational position after the position of the rotor core with respect to the coil group is rotated by 90° in the first rotation direction from the first position relationship, the current is caused to flow in the first direction.

* * * * *